No. 791,973.

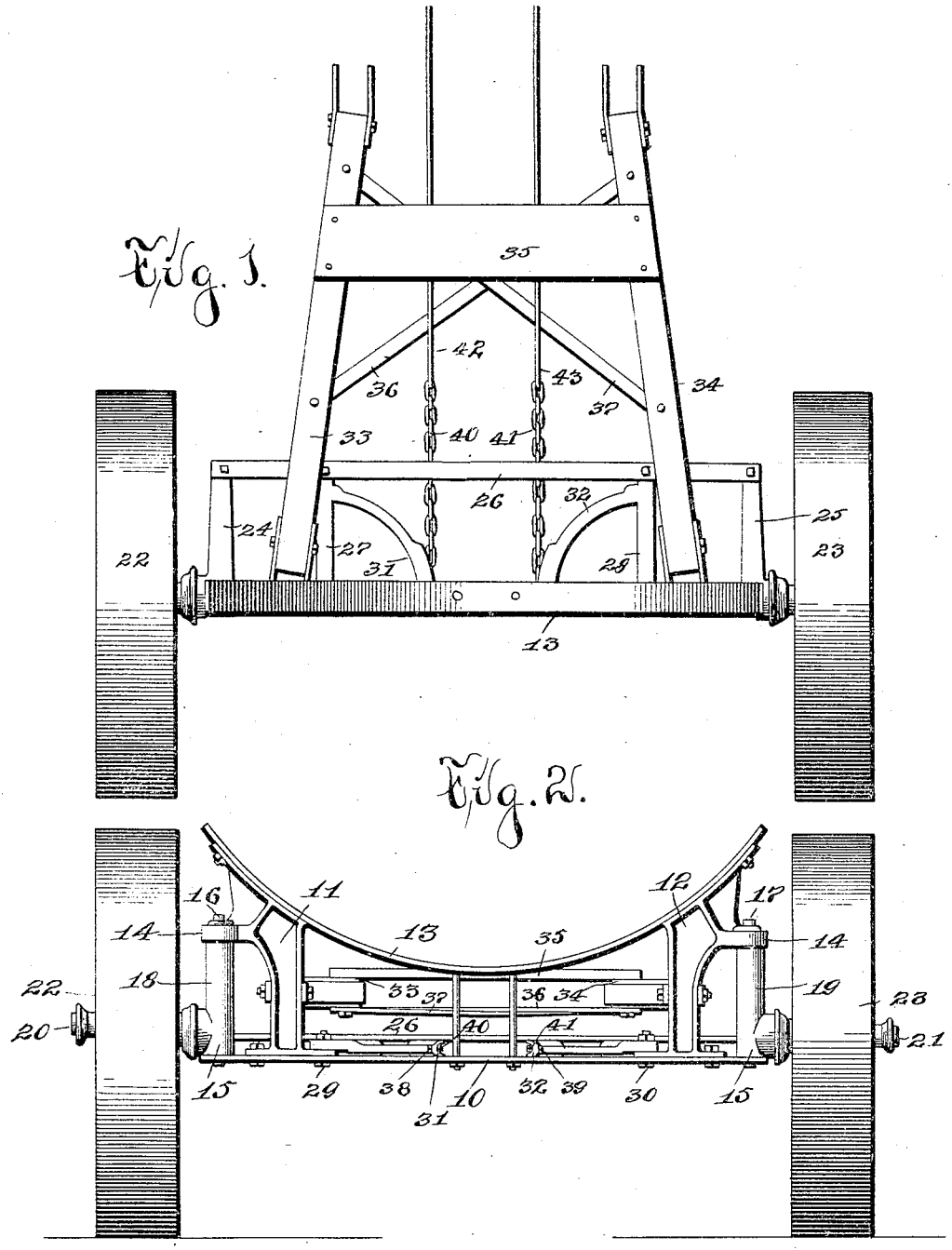

Patented June 6, 1905.

UNITED STATES PATENT OFFICE.

FRANZ J. WOOD, OF DES MOINES, IOWA, ASSIGNOR TO WOOD BROTHERS STEEL SELF-FEEDER COMPANY, OF DES MOINES, IOWA, A CORPORATION OF IOWA.

STEERING MECHANISM FOR TENDERS.

SPECIFICATION forming part of Letters Patent No. 791,973, dated June 6, 1905.

Application filed January 23, 1904. Serial No. 190,291.

*To all whom it may concern:*

Be it known that I, FRANZ J. WOOD, a citizen of the United States of America, and a resident of Des Moines, Polk county, Iowa, have invented a new and useful Steering Mechanism for Tenders, of which the following is a specification.

The object of this invention is to provide improved means for connecting the supporting and steering wheels of a tender to the steering mechanism of a traction-engine.

My invention consists in the construction, arrangement, and combination of elements hereinafter set forth, pointed out in my claims, and illustrated by the accompanying drawings, in which—

Figure 1 is a plan, and Fig. 2 is a rear elevation, illustrating the application of my improved devices to a tender-truck.

In the construction and mounting of the devices as shown the numeral 10 designates an axle-bar, to the opposite ends of which are fixed journal-brackets 11 12. The upper end portions of the journal-brackets 11 12 are fixed to opposite end portions of a bed-plate 13, curved from end to end and arranged to receive and support a tender-tank. (Not shown.) The journal-brackets 11 12 are formed with outwardly-projecting ears 14 15, which ears are vertically apertured to receive journals or pins 16 17. Wheel-brackets 18 19 are interposed between the ears of the journal-brackets and are journaled on the pins 16 17. Arms or axles 20 21 are formed on the wheel-brackets and project in opposite directions therefrom, and wheels 22 23 are journaled on said axles. The wheels 22 23 support the entire weight of the tender-truck and body or tank and also are employed to steer the tender, as hereinafter set forth. Arms 24 25 are formed on or fixed to and project forward from the wheel-brackets in a common horizontal plane and parallel with each other. The forward end portions of the arms 24 25 are connected pivotally to end portions of a steering-bar 26, which steering-bar extends across the tender-truck parallel with and in front of the axle-bar 10. Quadrants 27 28 are provided and are pivoted at the right-angled portions thereof to bolts 29 30, mounted in the axle-bar 10. The curved portions 31 32 of the quadrants are formed with grooved peripheries and are placed opposite each other on the truck. Beams 33 34 or side bars are provided and are fixed to and extend forward from the journal-brackets 11 12. The beams or side bars 33 34 are connected and braced by a bed-plate 35 and braces 36 37 in front of the bed-plate 13. The forward end portions of the beams or side bars 33 34 are shaped for attachment to a traction-engine, and such attachment may be direct or through the medium of a coupler of any desired character and either to the platform or some other part of said engine. Bolts 38 39 are mounted through the rear ends of the curved portions 31 32 of the quadrants 27 28 and are employed to connect the rear ends of chains 40 41 to said quadrants, washers interposed between the heads of the bolts and the rearmost links of the chain serving to bind said links to the grooved peripheries of the quadrants. The chains 40 41 extend forward approximately parallel with each other and are attached at their forward ends to draw-rods 42 43, and the forward ends of said draw-rods may be attached in any desired manner to the steering mechanism of the traction-engine. (Not shown.)

Draft applied to the chain 40 through the rod 42 will draw forward the innermost point of the quadrant 27 and cause the forward end of said quadrant, which is pivoted to the steering-bar 26, to move said steering-bar longitudinally to the left and swing the arms 24 25 to the left conjunctively. The swinging of the arms 24 25 to the left turns the wheel-brackets 18 19 in the journal-brackets and necessarily changes the direction of the wheels 22 23 and causes the tender to travel to the left. The draft relaxing from the chain 40 and applied to the chain 41 through the rod 43 will draw forward the innermost point of the quadrant 28, which has previously moved rearwardly and received a portion of the chain 41 in its grooved periphery and cause the forward end of said quadrant, which is pivoted also to the steering-bar 26, to move said steering-bar longitudinally to the right and swing the arms 24 25 to the right conjunctively. The swinging of the arms 24 25 to the right turns the wheel-brackets 18 19 back in the journal-brackets and necessarily changes the direction of the wheels 22 23 and causes the tender to travel to the right. When the parts are positioned as shown, the tender will travel in a straight line.

It will be observed that the quadrants 27 28 are pivoted independently of the wheel-bearings or brackets 18 19 and in a horizontal plane common to the arms 24 25 of said brackets. It also will be observed that these quadrants are located materially near the center of the space between the wheels 22 23 and have their grooved peripheries arranged in opposition to each other, so that the chains 40 41 and rods 42 43 extend forward in parallel planes from the quadrants and in relatively close relations to each other. It is a distinct advantage in arranging the chains near to or at the center of the machine in that it permits an attachment of the forward draft mechanism to the central portion of the steering-shaft of the engine, (not shown,) in which a direct draft on such device applies such draft in parallel lines instead of on crossed lines.

In am aware that Letters Patent No. 710,028 shows a wheel independent of the wheel-brackets or bearings and connected by crossed chains to parallel draft devices, and I also am aware that Letters Patent No. 594,866 shows segments rigidly connected to the wheel bearings or brackets connected with each other and oscillated by draft devices arranged approximately parallel with each other near the sides of the machine, and I do not claim either of such constructions.

I claim as my invention—

1. In a device of the class described, wheel-bearings mounted for oscillation on vertical axes, wheels mounted for revolution on said bearings, arms extending forward from said bearings parallel with each other, a steering-bar pivotally connecting said arms transversely of the machine, quadrants formed with grooved peripheries and pivotally mounted independent of each other and independent of the bearings with their grooved peripheries opposite each other, said quadrants pivotally attached at forward corners to said steering-bar, and draft devices attached to the grooved portions of the quadrants and adapted for attachment to draft mechanism of a traction-engine.

2. In a device of the class described, wheel-bearings mounted for oscillation on vertical axes, wheels mounted for revolution on said bearings, arms extending forward from said bearings parallel with each other, quadrants formed with grooved peripheries and pivotally mounted independent of each other and independent of the wheel-bearings and located between said wheel-bearings with their grooved peripheries opposite each other, a steering-bar extending transversely of the machine and pivotally connected to the forward ends of said arms and to the forward corners of said quadrants, and draft devices attached to the grooved portions of the quadrants and adapted for attachment to draft mechanism of a traction-engine.

Signed by me at Des Moines, Iowa, this 5th day of December, 1903.

FRANZ J. WOOD.

Witnesses:
O. F. DORRANCE,
R. G. ORWIG.